United States Patent
Bal et al.

(10) Patent No.: US 7,991,243 B2
(45) Date of Patent: Aug. 2, 2011

(54) RADIAL ADAPTIVE FILTER FOR METAL ARTIFACT CORRECTION

(75) Inventors: Matthieu Bal, Aachen (DE); Hasan Celik, Oyonnax (FR); Kai Eck, Aachen (DE); Lothar Spies, Aachen (DE); Krishna Subramanyan, Solon, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1020 days.

(21) Appl. No.: 11/815,215

(22) PCT Filed: Feb. 1, 2006

(86) PCT No.: PCT/IB2006/050346
§ 371 (c)(1),
(2), (4) Date: Aug. 1, 2007

(87) PCT Pub. No.: WO2006/082563
PCT Pub. Date: Aug. 10, 2006

(65) Prior Publication Data
US 2008/0152203 A1    Jun. 26, 2008

Related U.S. Application Data

(60) Provisional application No. 60/649,676, filed on Feb. 3, 2005.

(51) Int. Cl.
*G06K 9/40* (2006.01)
*G06K 9/00* (2006.01)
*A61B 6/00* (2006.01)

(52) U.S. Cl. ................. 382/275; 382/131; 378/21

(58) Field of Classification Search .............. 382/131, 382/132, 254, 261, 274, 275, 312; 378/4, 378/7, 14, 21
See application file for complete search history.

(56) References Cited

U.S. PATENT DOCUMENTS

| 5,416,815 A | 5/1995 | Hsieh |
| 5,473,656 A * | 12/1995 | Hsieh et al. .............. 378/4 |
| 6,507,633 B1 * | 1/2003 | Elbakri et al. ............ 378/8 |

(Continued)

FOREIGN PATENT DOCUMENTS
WO    2005076221 A1    8/2005

OTHER PUBLICATIONS

Bal, M., et al.; Radial adaptive filter for metal artifact reduction; 2004; SPIE Conf. on Medical Imaging; Abstract.

(Continued)

*Primary Examiner* — Kanji Patel

(57) ABSTRACT

A diagnostic imaging system (10) corrects metal artifact streaks (38) emanating from a metal object (36) in a tomographic image (T). A first processor (40) reduces streaks (38) caused by mild artifacts by applying an adaptive filter (82). The filter (82) is perpendicularly oriented toward the center of the metal object (36). The weight of the filter (82) is a function of the local structure tensor and the vector pointing to the metal object (36). If it is determined that the strong artifacts are present in the image, a second processor (48) applies a sinogram completed image algorithm to correct for severe artifacts in the image. The sinogram completed image and adaptively filtered image are fused to a final corrected image. In the fusion process, highly corrupted tomographic regions are replaced by the result of the sinogram completed image and the remainder is replaced by the adaptively filtered image.

18 Claims, 4 Drawing Sheets

U.S. PATENT DOCUMENTS

Figure 1:
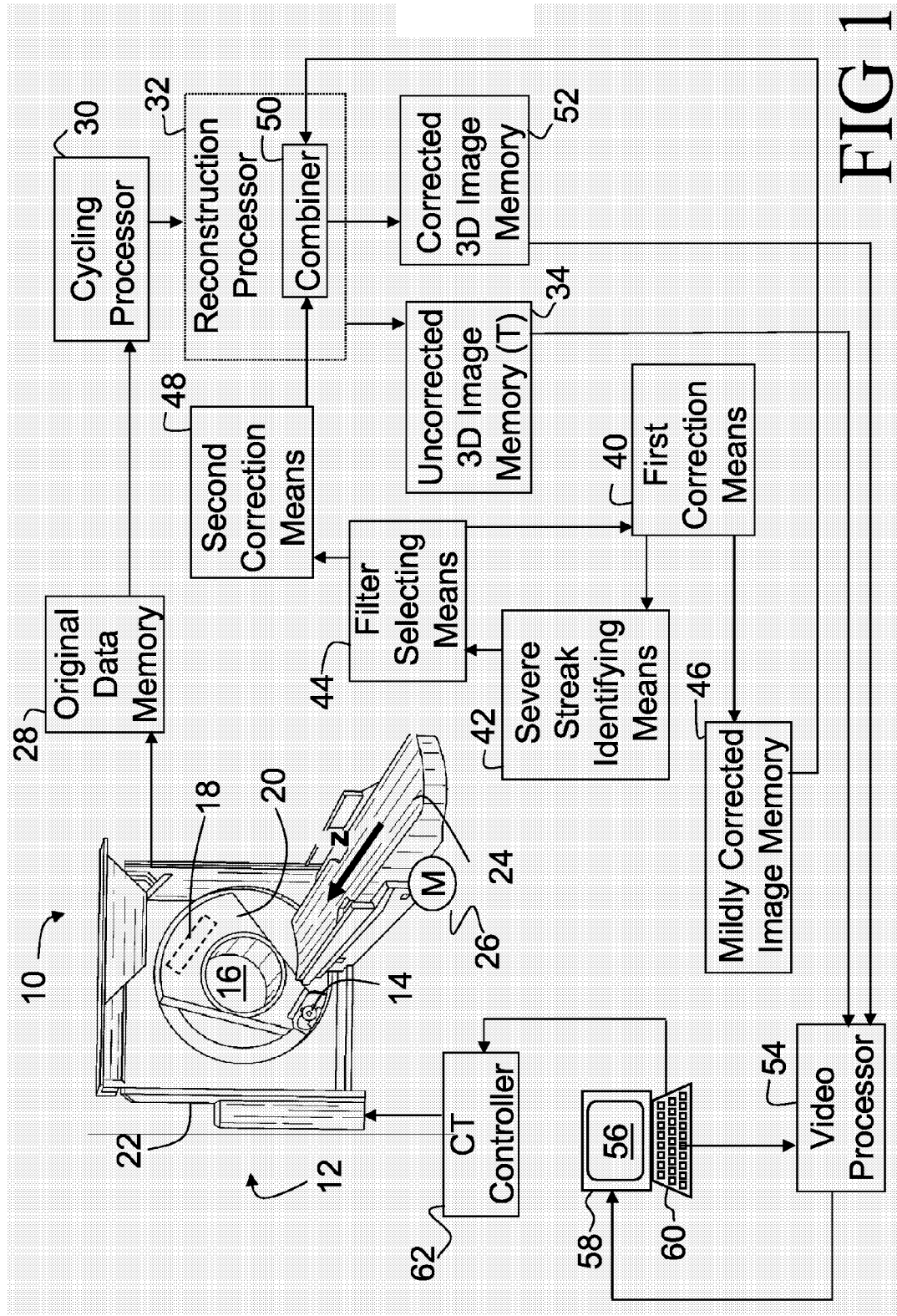

| | | | |
|---|---|---|---|
| 6,754,298 B2 * | 6/2004 | Fessler | 378/4 |
| 6,940,286 B2 * | 9/2005 | Wang et al. | 324/450 |
| 6,944,264 B2 * | 9/2005 | Bijjani et al. | 378/57 |
| 7,356,174 B2 * | 4/2008 | Leue et al. | 382/131 |
| 7,567,693 B2 * | 7/2009 | deCharms | 382/128 |
| 7,660,453 B2 * | 2/2010 | Lang | 382/132 |
| 2003/0071220 A1 | 4/2003 | Bruder et al. | |
| 2004/0257381 A1 | 12/2004 | Brunner et al. | |

OTHER PUBLICATIONS

Hsieh, J.; Adaptive streak artifact reduction in computed tomography resulting from excessive x-ray photon noise; 1998; Am. Assoc. Phys. Med.; 25(11)2139.

Chen, L., et al.; A novel method for reducing high attenuation object artifacts in CT reconstruction; 2002; SPIE Conf. on Medical Imaging; vol. 4684; pp. 841.

Kachelriess, M., et al.; Generalized multi-dimensional adaptive filtering for conventional and spiral single-slice, multi-slice, and cone-beam CT; 2001; Med. Phys.; 28(4)475.

Saint Olive, C., et al.; Segmentation aided adaptive filtering for metal artifact reduction in radio-therapeutic CT images; 2004; SPIE Conf. on Medical Imaging; vol. 5370; pp. 1991-2002.

Watzke, O., et al.; A pragmatic approach to metal artifact reduction in CT: merging of metal artifact reduced images; 2004; Eur. Radiol.; 14:849-856.

* cited by examiner

RADIAL ADAPTIVE FILTER FOR METAL ARTIFACT CORRECTION

CROSS REFERENCE TO RELATED APPLICATIONS

This application claims the benefit of U.S. provisional application Ser. No. 60/649,676 filed Feb. 3, 2005, which is incorporated herein by reference.

The present application relates to the diagnostic imaging arts. It finds particular application in computed tomography imaging of a subject that includes high density regions such as metal implants, dental fillings, and the like, and will be described with particular reference thereto. However, it can also find application in other types of tomographic imaging such as single photon emission computed tomography (SPECT), positron emission tomography (PET), three-dimensional x-ray imaging, and the like.

In CT imaging, high absorbing objects such as metal bodies may cause significant artifacts, which may compromise the diagnostic value of the image. Metal artifacts arise when the imaged region of interest contains metal implants, dental fillings, bullets, or other articles of high radiation absorption which prevent the x-rays from fully penetrating the subject. Projection line integrals passing through the regions of high density are so highly attenuated by the high density regions that data about other regions along the line integral are lost or overshadowed. This leads to substantial measurement errors. The filtered backprojection or other reconstruction process translates these measurement errors into image artifacts, e.g. streaks which typically emanate from the high intensity region. The streaks deteriorate image quality and can obliterate structure of the region.

The current correction algorithms substantially reduce the artifacts in highly corrupted regions. One such method for correcting metal artifacts includes performing filtered backprojection to generate an uncorrected reconstructed image, identifying a region of high density in the uncorrected reconstructed image, and replacing rays of projections that pass through the high density region with synthetic projection data having reduced absorption attenuation values. The corrected projection data again undergoes filtered backprojection to produce a corrected reconstructed image.

Another method, the sinogram completion method, replaces corrupted regions in the sinogram data of a corrected model. The original, uncorrected tomogram image is segmented into different material classes such as bone, tissue, air. Pixels of the metal are identified and assigned a Hounsfield number of the surrounding material. The sinogram model data is generated from the classified tomogram data by a forward projection adapted to the scanner geometry. The segments of the original tomogram that have been identified as metal are replaced by the respective segments from the model sinogram. A conventional backprojection is then used to reconstruct a metal reduced 3D image.

The above and other known correction algorithms work well in certain applications, particularly in images with a severe artifact. However, the known correction techniques cause a significant reduction of the contrast resolution.

There is a need for an automated correction technique that compensates for mild metal artifacts in the image. The present invention contemplates a method and apparatus that overcomes the aforementioned limitations and others.

According to one aspect of the present application, a diagnostic imaging system which corrects metal artifact streaks emanating from a high attenuating object in an uncorrected tomographic image is disclosed. A first vector means determines a direction vector for each pixel, which direction vector points in the direction of one of the high attenuating objects. A second vector means determines an orientation vector for each pixel, which orientation vector coincides with a steepest gradient direction. An adaptive filter means adaptively filters the uncorrected tomographic image based at least on one of the determined orientation size of the steepest gradient vector, and a size of the direction vector.

According to another aspect of the present application, a method of diagnostic imaging which corrects metal artifact streaks emanating from a high attenuating object in an uncorrected tomographic image is disclosed. A direction vector for each pixel is determined, which direction vector points in the direction of one of the high attenuating objects. An orientation vector for each pixel is determined, which orientation vector coincides with a direction of steepest gradient. The uncorrected tomographic image is adaptively filtered based at least on one of the determined orientation of the steepest gradient vector, a size of the steepest gradient vector, and a size of the direction vector.

One advantage of the present application resides in dynamic reduction of mild artifacts.

Another advantage resides in local dynamic adjustment of the noise smoothing.

Another advantage resides in reduction of degradation of image quality caused by other correction techniques.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

Figure 2:
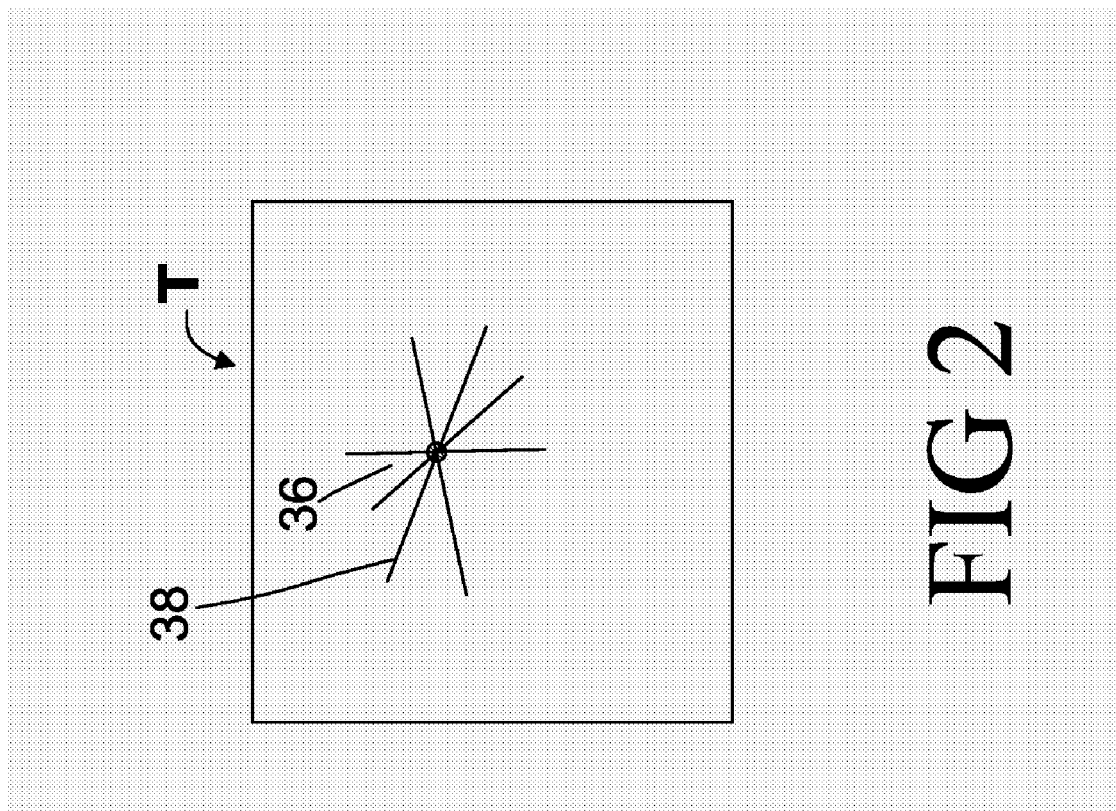
Figure 3:
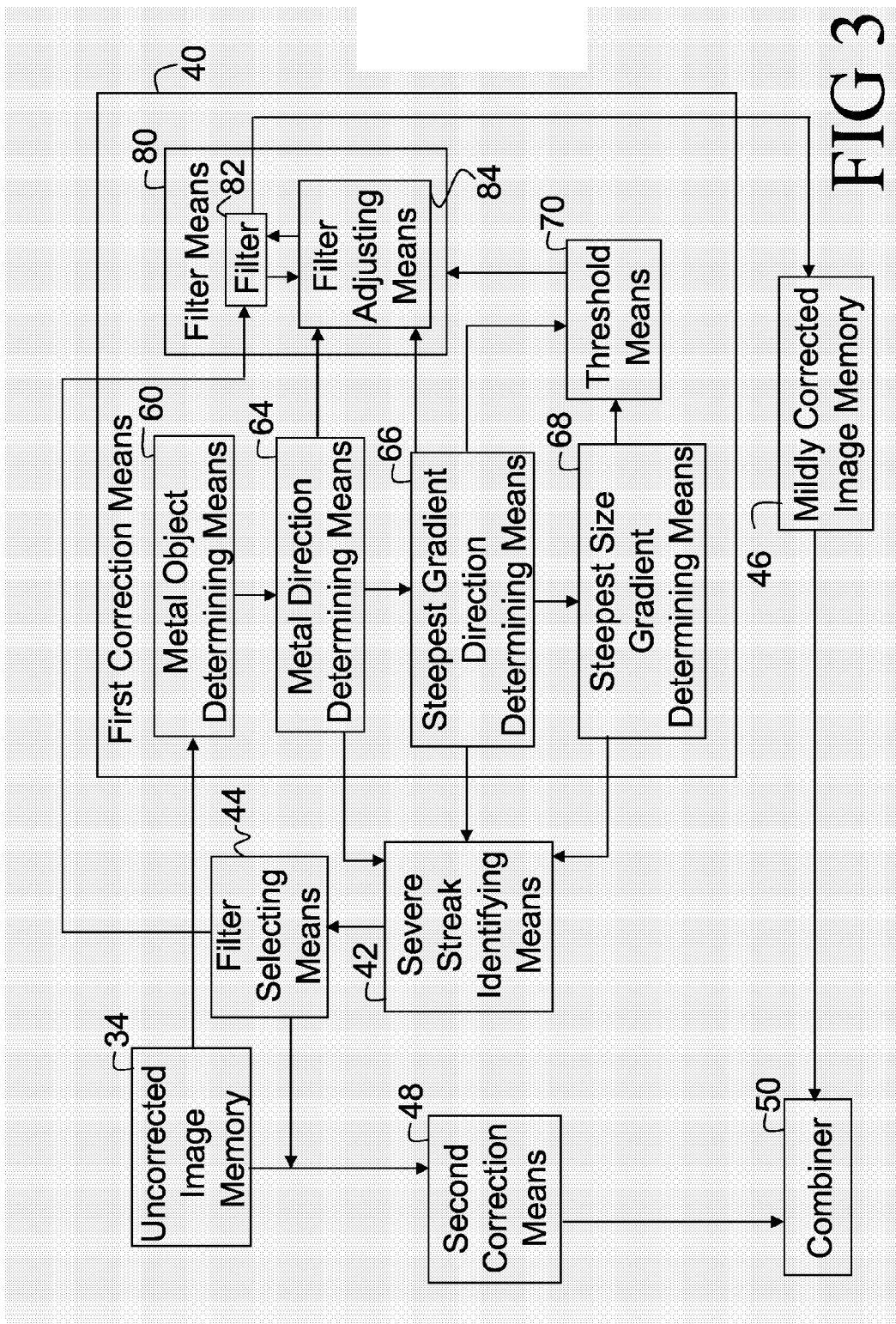
Figure 4:
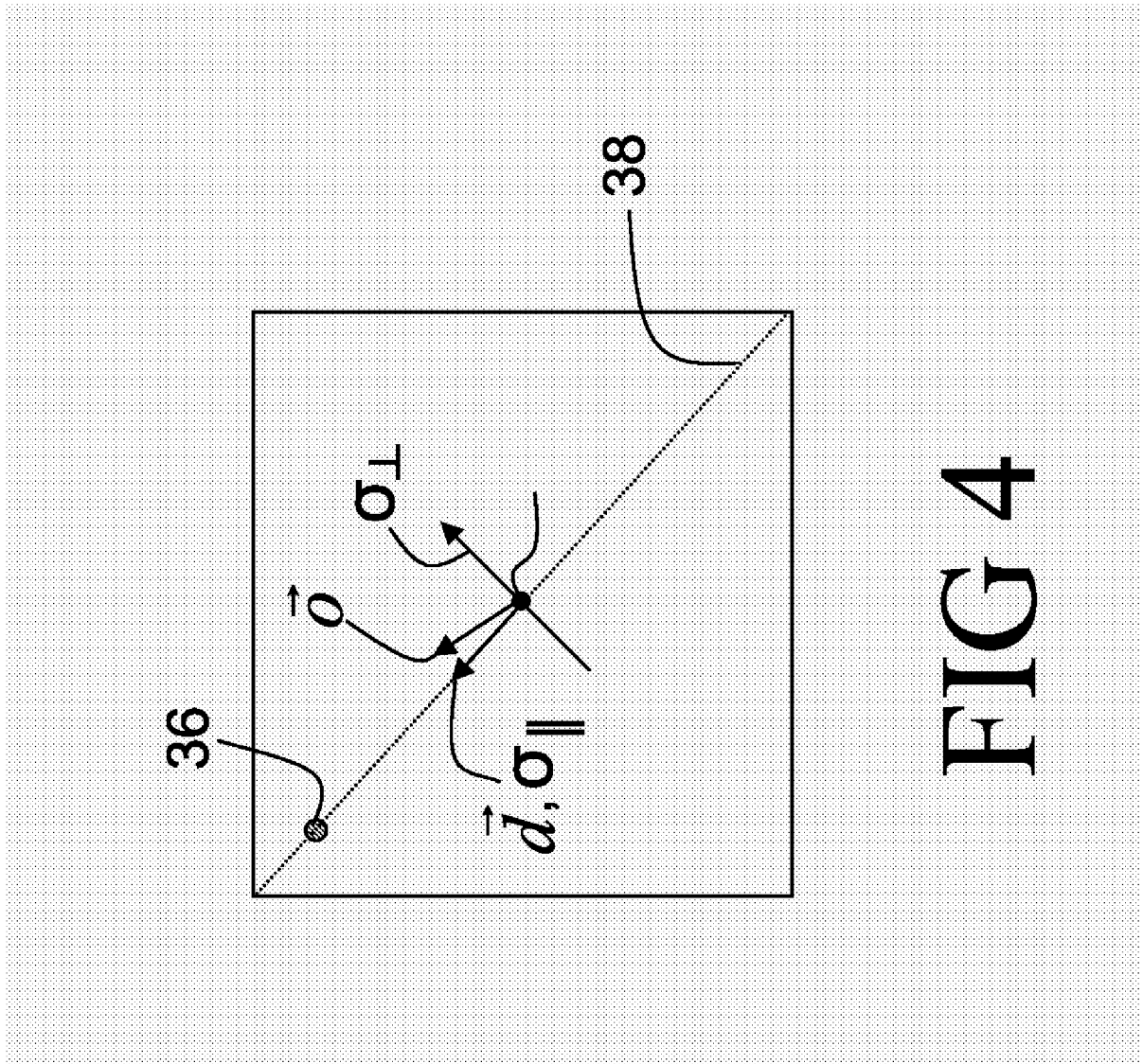

FIG. 1 diagrammatically shows a computed tomography imaging system including an artifact-correction process according to the present application;

FIG. 2 diagrammatically shows a metal object which causes streaks in the image;

FIG. 3 diagrammatically shows an expanded portion of the computed tomography imaging system including an artifact-correction process; and FIG. 4 diagrammatically shows a local structure tensor with direction and orientation vectors.

With reference to FIG. 1, an imaging system 10 includes a computed tomography scanner 12 having a radiation source 14 that produces a radiation beam directed into an examination region 16. The radiation beam interacts with and is partially absorbed as it traverses a region of interest of an imaging subject disposed in the examination region 16, producing spatially varying absorption of the radiation as it passes through the examination region. A radiation detector 18 detects the absorption-attenuated radiation after it passes through the examination region 16.

Preferably, the radiation source 14 produces a fan-beam or cone-beam of x-rays. The radiation source 14 and the detector 18 are preferably mounted in oppositely facing fashion on a rotating gantry 20 so that the detector 18 continuously receives x-rays from the radiation source 14. As the source 14 and the detector 18 rotate about the examination region 16 on the rotating gantry 20, views are acquired over an angular range of preferably about 360° or more. Optionally, a reduced scan of between about 180° and 360° is used. In one embodiment, the detector 18 is replaced by a stationary detector ring mounted on a stationary gantry 22. Typically, a subject support 24 is linearly movable in an axial or z-direction by a motor means 26.

Multiple-slice computed tomography projection data are acquired by performing successive axial scans with the subject support 24 being stationary during each axial scan and stepped linearly between axial scans. In this arrangement, the detector 18 can have either a single row of detector elements (that is, a one-dimensional detector) or a two-dimensional array of detector elements. Alternatively, helical computed tomography projection data are acquired during continuous linear movement of the subject support 24 and simultaneous rotation of the gantry 20.

The outputs of detector elements of the radiation detector 18 are converted to electric acquired integrated attenuation projection values $\mu d_0$ that are stored in a data memory 28. Each projection datum $\mu d_0$ corresponds to a line integral of attenuation along a line from the radiation source 14 to a corresponding one of the detector elements of the detector 18. The projection data can be represented in a sinogram format in which each two-dimensional slice of the imaged region of interest is represented by a projection data array having coordinates of viewing angle ($\phi$) and line integral index (n).

For typical fan-beam and cone-beam geometries, the line integral index n typically corresponds to a detector index indicating a detector element used to measure the projection of index n. It is contemplated, however, that the line integral index n may lack a direct correspondence with detector element number. Such a lack of direct correspondence can result, for example, from interpolation between rebinned projections.

With continuing reference to FIG. 1, a cycling processor 30 cycles through the sinograms corresponding to spatial slices (in the slice embodiment) and successively inputs each sinogram into a reconstruction processor 32. The reconstruction processor 32 reconstructs the input data into a 3D uncorrected tomographic image T which is stored in an uncorrected 3D image memory 34. Although picture elements of a 2D or slice image are commonly denoted as "pixels", and elements of a 3D or volume image are often denoted as "voxels"; "pixels" is used herein generally to refer to picture elements of both 2D and 3D images.

With reference to FIG. 2, the presence of one or more high density regions 36 in the slice typically causes the uncorrected reconstructed image T to include metal artifacts which generally manifest in the image as streaks 38 extending away from the high density region 36. The diagrammatic reconstructed image T of FIG. 2 is not intended to correspond to images of any particular anatomical structure, but rather diagrammatically illustrate features of the artifact-correcting reconstruction process that are typically observable in image space.

With reference again to FIG. 1, a first correction means or processor or algorithm 40 receives an uncorrected image data and performs correction of mild artifacts by a use of an adaptive filter to generate a corrected 3D tomographic image representation T'. The artifacts introduced by high density regions such as metal clips, high-density dental fillings, or the like, are substantially smoothed out by the adaptive filtering as will be described in a greater detail below. In one embodiment, a severe artifact identifying means 42 compares the data against a prespecified threshold to distinguish mild artifacts from severe artifacts. If no severe artifacts are found, a filter selecting means 44 effectuates adaptive filtering. The adaptively filtered image is loaded into a mildly corrected image memory 46. If the severe artifacts are present, the filter selecting means 44 effectuates a second correction means 48, which performs correction of the severe artifacts by one of the known correction algorithms such as the sinogram completion method described in OLIVE, KAUS, PEKAR, ECK, and SPIES, *Segmentation aided adaptive filtering for metal artifact reduction in radio-therapeutic CT images*, Medical Imaging 2004, Proceedings of SPIE, vol. 5400, SPIE, SPIE, Bellingham, Wash., Feb. 24, 2004, pp. 1991-2002. In short, if the severe artifacts are determined to be present in the image, the original, uncorrected tomogram image is segmented into different material classes such as bone, tissue, air. Pixels of the metal are identified and assigned a Hounsfield number of the surrounding material. The sinogram model data is generated from the classified tomogram data by a forward projection adapted to the scanner geometry. The segments of the original tomogram that have been identified as metal are replaced by the respective segments from the model sinogram. A conventional backprojection is then used to reconstruct a metal reduced sinogram completed 3D image. Of course, other artifacts correction techniques for correcting the severe artifacts are contemplated.

A combiner 50 fuses the sinogram completed image and the adaptively filtered image into a final corrected image in which highly corrupted tomogram regions are replaced by the result of the sinogram completed image and the remainder is replaced by the adaptively filtered image. Merging of the metal artifact reduced images is preferably performed by an appropriate fusion function such as the fusion function based on the artifact expectation map from the metal sinogram that is described in detail in WATZKE and KALENDER, *A pragmatic approach to metal artifact reduction in CT: merging of metal artifact reduced images*, European Radiology, vol. 14, no. 5, pp. 849-56, May 2004. Of course, other fusion functions are also contemplated. In one embodiment, the difference between the sinogram competed image and the adaptively filtered image is determined. If the difference is essential, the sinogram completed image is mostly used for combining two images. If the difference is not significant, the adaptively filtered image is mostly used for combining two images.

Spatially successive artifact-corrected reconstructed image slices, slabs or volumes are accumulated in a corrected 3D image memory 52 to define a three-dimensional artifact-corrected reconstructed volume image. If, however, the acquired projection data is limited to a single slice of the region of interest, then the acquired projection data corresponding to the single slice is processed by the reconstruction processor 32 and the corrected 3D image memory 52 stores a two-dimensional artifact-corrected reconstructed image. Optionally, projection data corresponding to one or more image slices are acquired over a selected time interval to provide a temporal series of artifact-corrected reconstructed image slices or image volumes representative of a temporal evolution of the region of interest.

A video processor 54 processes some or all of the contents of the corrected 3D image memory 52 or, optionally, of the uncorrected 3D image memory 34 to create a human-viewable image representation such as a three-dimensional rendering, a selected image slice, a maximum intensity projection, a CINE animation, or the like. The human-viewable image representation is displayed on a display 56 of a user interface 58, which is preferably a personal computer, a workstation, a laptop computer, or the like. Optionally, selected contents of image memories 34, 52 are printed on paper, stored in a non-volatile electronic or magnetic storage medium, transmitted over a local area network or the Internet, or otherwise processed. Preferably, a radiologist or other operator controls the computed tomography imaging scanner 12 via an input means 60 to program a CT controller 62 to set up an imaging session, modify an imaging session, execute an imaging session, monitor an imaging session, or otherwise operate the scanner 12.

With continuing reference to FIG. 1 and further reference to FIG. 3, the first correction means 40 receives the uncorrected tomographic image data T and determines two vectors for each pixel of the tomogram. Since all streaks emanate from the metal object 36, each streak 38 can be represented by a first vector or direction vector $\vec{d}$. A metal direction determining means 64 determines the direction vector $\vec{d}$ which points toward the metal object 36. A steepest gradient direction determining means 66 calculates a second vector or orientation vector $\vec{o}$ by a use of the structure tensor. A steepest gradient size determining means 68 determines a size of the second vector $\vec{o}$. A threshold means 70 compares the size of the second vector $\vec{o}$ to a predefined normal gradient between the bone structure and tissue to determine whether the determined gradient is the normal gradient between bone structure and tissue or the streak gradient between the streak and other anatomical structures. Optionally, other criteria, such as the direction of the second vector, values of adjacent pixels and other, is used to delineate streaks from other dense and/or non-dense interfaces. If it is determined that the gradient is indeed a streak gradient, a filter means 80 corrects the determined streaks by applying an adaptive filtering process or filter 82 to each corrupted pixel.

However, if it is determined that a pixel value is not degraded by a streak, a relatively narrow filter is applied in all directions. Preferably, for a streak, the filter means 80 applies an asymmetric Gaussian filter which is oriented toward the metal object 36. More specifically, the filter means 80 applies the local smoothing filter 82 with a function $f$ of characteristic width $\Delta$ which is a function of the local structure tensor and the direction vector $\vec{d}$ at the pixel that is currently being smoothed. A filter adjusting means 84 adjusts the filter 82 to produce the biggest adjustment in the direction orthogonal to the direction vector $\vec{d}$, e.g. the direction perpendicular to the metal. The standard deviation $\sigma_\perp$ of the Gaussian filter 82 perpendicular to the direction vector $\vec{d}$ is a function of a size of the orientation vector $\vec{o}$ or the maximum eigenvalue $\lambda_{max}$ of the structure tensor, and the dot product between the (normalized) direction vector $\vec{d}$ and the (normalized) orientation vector $\vec{o}$:

$$\sigma_\perp = f(\vec{d}, \vec{o}).$$

For example:

$$\sigma_\perp = \sigma_0 (\vec{d} \cdot \vec{o})^{p_1} \lambda_{max}^{p_2} \text{ or}$$

$$\sigma_\perp = \sigma_0 (\vec{d} \cdot \vec{o})^{p_1} |\vec{o}|^{\frac{p_2}{p_1}} \sigma_\perp$$

where $\sigma_0$, $p_1$ and $p_2$ are constants.

The filter adjusting means 84 adjusts the filter 82 to produce smaller adjustments in the direction parallel to the direction vector $\vec{d}$, e.g. the direction parallel to the metal. The standard deviation $\sigma_\parallel$ of the Gaussian filter 82 parallel to the direction vector $\vec{d}$ $\vec{d}$ has a smaller value. For example:

$$\sigma_\parallel = \sigma_\perp/2.$$

As a result of such adjustments, the noise is adjusted locally at each pixel without substantially impairing the spatial resolution. The filter width in each pixel is adapted to a presence of the metal.

One example of a narrow filter for non-streak areas is one, which replaces the pixel to be filtered with the sum of 84% of its original grayscale value plus 2% of the value of each of its eight surrounding nearest neighbors. An example of a streak filter is one, which replaces the pixel to be filtered with the sum of 26% of its original grayscale value plus 30% of its nearest neighbor orthogonal to the streak direction in the direction of steepest gradient plus 20% of its next nearest neighbor in the same direction plus 10% of the next, next nearest neighbor in the same direction plus 2% of the seven other nearest neighbors in other directions. The actual magnitudes and number of pixels that the filter extends in each direction vary with the degree and nature of streak (or other) artifact. Various other filters are also contemplated.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A diagnostic imaging system which corrects metal artifact streaks emanating from a high attenuating object in an uncorrected tomographic image, the system comprising:
    a first vector means for determining a direction vector for each pixel, which direction vector points in the direction of the high attenuating object;
    a second vector means for determining an orientation vector for each pixel, which orientation vector coincides with a steepest gradient direction; and
    an adaptive filter means for adaptively filtering the uncorrected tomographic image based at least on the determined orientation of the steepest gradient vector.

2. The system as set forth in claim 1, wherein the adaptive filter means includes:
    an adjustable dynamic adaptive filter which is applied at least to pixels of the tomographic image that are intersected by the streak; and
    a filter adjusting means for adjusting the adaptive filter in accordance with a degree to which each filtered pixel is corrupted by the streak.

3. The system as set forth in claim 1, further including:
    a means for determining a size of the steepest gradient; and
    a threshold means for determining if the steepest gradient indicates a streak by at least one of:
        comparing the size of the steepest gradient to a prespecified threshold value, and
        comparing the direction of the steepest gradient to a direction perpendicular to the direction vector.

4. The system as set forth in claim 3, wherein the adaptive filter includes an adaptive asymmetric Gaussian filter which is adjustable to be oriented orthogonal to the vector pointing in the direction of the high attenuating object.

5. The system as set forth in claim 4, further including:
    a means for adjusting the adaptive filter to have a largest width in the direction perpendicular to the direction vector and a smallest width in a direction parallel to the direction vector such that the biggest correction is performed in the direction perpendicular to the direction vector.

6. The system as set forth in claim 4, wherein the Gaussian filter is scalable in accordance with a magnitude of the steepest gradient.

7. The system as set forth in claim 1, further including:
a second correction means for reducing severe artifacts in the tomographic image.

8. The system as set forth in claim 7, wherein the second correction means applies a sinogram completion algorithm to reduce severe artifacts.

9. The system as set forth in claim 8, further including:
a means for fusing the adaptively corrected image and sinogram completed image into a 3D image representation.

10. A method of diagnostic imaging, which corrects metal artifact streaks emanating from a high attenuating object in an uncorrected tomographic image, comprising:
determining a direction vector for each pixel which direction vector points in the direction of the high attenuating object;
determining an orientation vector for each pixel which orientation vector coincides with a direction of steepest gradient; and
adaptively filtering the uncorrected tomographic image based at least on the determined orientation of the steepest gradient vector.

11. The method as set forth in claim 10, wherein the step of adaptive filtering includes:
applying an adjustable dynamic adaptive filter at least to pixels of the tomographic image that are intersected by the streak; and
adjusting the adaptive filter in accordance with a degree to which each filtered pixel is corrupted by the streak.

12. The method as set forth in claim 10, further including:
adjusting the adaptive filtering to have a largest width in the direction perpendicular to the direction vector and a smallest width in a direction parallel to the direction vector such that the biggest correction is performed in the direction perpendicular to the direction vector.

13. The method as set forth in claim 10, further including:
determining a size of the steepest gradient; and
determining whether the steepest gradient indicates a streak by at least one of:
comparing the size of the steepest gradient to a prespecified threshold value, and
comparing the direction of the steepest gradient to a direction perpendicular to the direction vector.

14. The method as set forth in claim 13, wherein the adaptive filter is an asymmetric Gaussian filter which is oriented in one of:
orthogonal to the direction of the high attenuating object, and
parallel to the direction of the steepest gradient.

15. The method as set forth in claim 14, wherein the Gaussian filter is scalable in accordance with a magnitude of the steepest gradient.

16. The method as set forth in claim 10, further including:
reducing severe artifacts in the tomographic image.

17. The method as set forth in claim 16, wherein the step of artifacts reduction includes:
applying a sinogram completion algorithm to reduce severe artifacts.

18. The method as set forth in claim 17, further including:
fusing the adaptively corrected image and sinogram completed image into a 3D image representation.

* * * * *